May 3, 1949. F. M. DRAKE 2,468,808
GAS BLANKETED ARC WELDING
Filed March 12, 1947
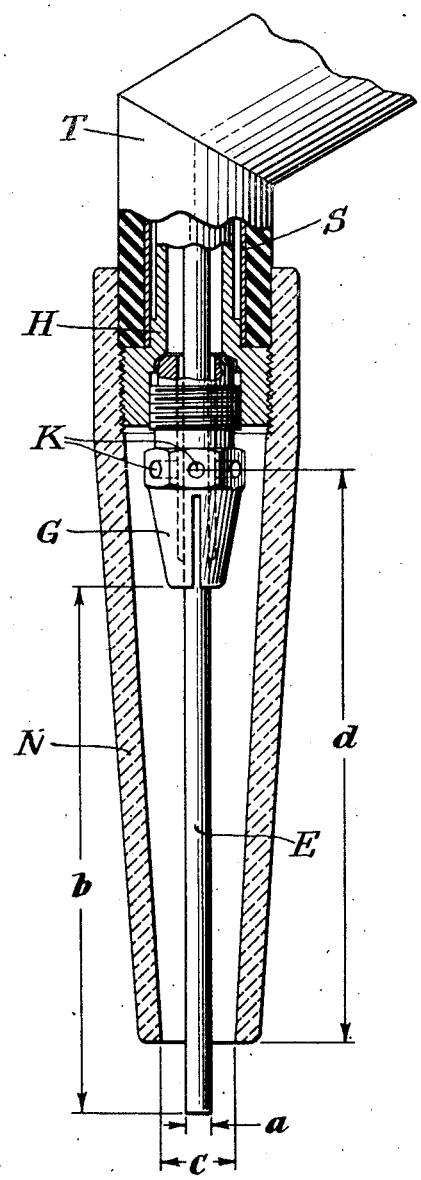
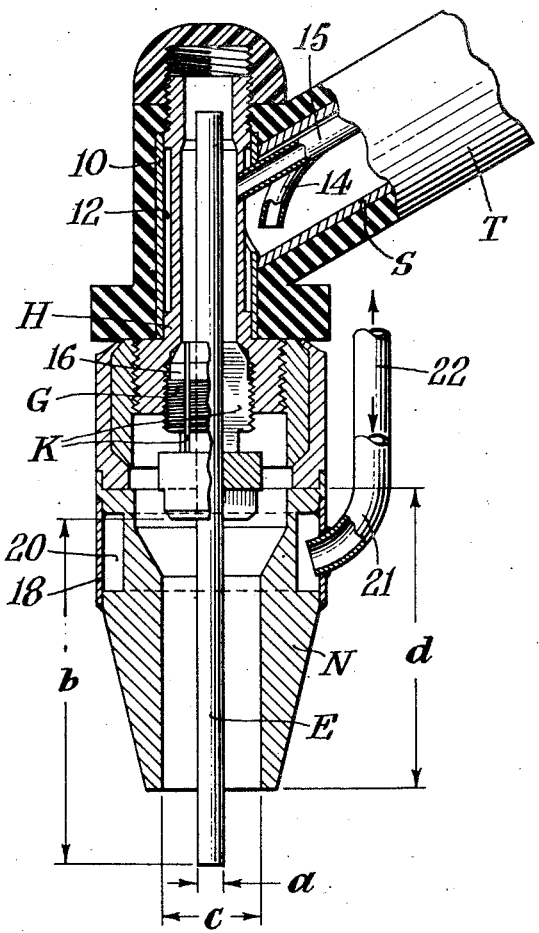
INVENTOR
FRANCIS M. DRAKE
BY
ATTORNEY Patented May 3, 1949

2,468,808

UNITED STATES PATENT OFFICE 2,468,808

GAS BLANKETED ARC WELDING

Francis M. Drake, Woodbridge, N. J., assignor to The Linde Air Products Company, a corporation of Ohio Application March 12, 1947, Serial No. 734,049

9 Claims. (Cl. 219—10)

This invention relates to gas blanketed arc welding, and more particularly to processes of this character for welding difficultly weldable metals, such as magnesium, aluminum, stainless steel, and special alloys and bronzes. In such processes the arc and molten portions of the work are blanketed with a non-oxidizing gas containing an inert noble monatomic gas such as helium or argon. The arc is struck through the gas between the work and a refractory metal electrode which is preferably formed of a substantially non-consumable material such as tungsten or molybdenum.

Such processes have been subject to arc instability, arc wandering, or arc blow, in that the arc is wild, and tends to wander over the electrode tip from one hot spot to another, or to go out. This phenomenon has been very troublesome, resulting occasionally in irregular, unsymmetrical, weak and non-uniform weld beads which have a black or dirty surface appearance.

High current density could not be used, only thin plates could be welded, the welding speed was slow, and the electrode deterioration was high. The distance between the nozzle or gas cup and the work had to be kept so close that it was difficult for the operator to see the operation. The welding was generally difficult and did not give consistent performance.

In alternating current welding some of these difficulties were attributed to rectification, which partly or completely eliminated the reverse polarity component which constituted the electrode positive half of the cycle. To combat this condition the use of emissive coatings and polarity ratio control have been proposed, separately or in combination. The use of emissive coatings necessitated the spraying or painting of the work surface with materials such as barium or strontium carbonates to increase the electron emissive power of the work surface. The polarity ratio control consisted of utilizing a storage battery in series with an ordinary alternating current welding circuit, for control of the relative voltages of the reverse and straight polarity components. The battery voltage could be added to one component and subtracted from the other component in any desired amount, thus effecting control of the components. However, each of these methods required special equipment, or special preparation or technique.

Objects of the present invention are therefore to provide in gas blanketed arc welding a quiet, stable arc which produces a uniform weld bead, clean surface appearance, and a strong, sound weld, without requiring the special apparatus or special preparation referred to above, to increase the welding speed, and to permit the welding of thicker plates.

Other objects and features of novelty will be apparent from the following description and the accompanying drawing, in which Fig. 1 is a vertical cross-section through a gas blanketed arc welding torch proportioned according to and for carrying out the method of the present invention; and Fig. 2 is a similar view showing a modification of the torch.

By contrast to prior expedients, a much simpler method has been discovered which comprises the use of high current density along with laminar, non-turbulent flow of the inert gas stream, and increase in the bare or unsupported length of the electrode in the gas stream. For this high current density with alternating current the amperage is within a range of the order of from 60 to 120 amperes on a one-sixteenth inch diameter electrode up to above 750 amperes on a three-eighths inch diameter electrode. The laminar, non-turbulent flow of the inert gas is provided by the use of a nozzle or gas cup having a substantially cylindrical wall with a diameter of the order of 2⅓ to 4 times the electrode diameter and a length of the order of from 4 to 8 times its own diameter. The electrode extension is of the order of from between sixteen diameters for a one-sixteenth inch electrode and 6 or 7 diameters for a three-eighths inch electrode.

All three factors combine to produce arc stability. The high current density results in high temperature of the electrode tip, which assists ionization of the inert gas and thereby tends to stabilize the arc. The uniform laminar flow of the inert gas eliminates turbulence and eddy currents which would interfere with the arc stability. The electrode extension and uniform laminar gas flow prevent deterioration of the electrode which might otherwise result from the use of such high current density.

The high temperatures desired involve the hazard of melting parts of the torch. The melting hazard is greatest for the nozzle or gas cup, because that is closest to the arc. Hence it is preferred to operate at the highest temperature which the cup will stand. When the nozzle is constructed of material which will not melt, no cooling is employed, and when a metal nozzle is used, the cooling is only sufficient to prevent melting, and located so as to maintain the highest temperature for the electrode tip and argon stream possible without melting the nozzle. The best operation may be described as a condition of skin melting of the electrode tip. This requires inert gas protection against oxidation which is provided by the laminar flow in the long nozzle. The water cooling of the clutch or electrode holder is provided to save space, to enable the parts to be made smaller for convenience in handling.

Fig. 1 shows a torch T which is of the general type shown in Meredith Patent No. 2,376,265, and embodying a metal tube S for supplying electric welding current to an electrode holder H having a clutch G which grips an electrode E, and for supplying inert gas through orifices K to the interior of the nozzle N. The dimension (a) is the size of the electrode, measured in inches of diameter. The dimension (b) is the bare or unsupported length of the electrode, measured in inches from the end of the holder H to the electrode tip. The dimension (c) is the cup diameter or internal diameter of the nozzle orifice in inches. The dimension (d) is the nozzle length, measured in inches from the orifices G to the outer end of the nozzle N. In this form the nozzle N is of ceramic material. When alternating current is employed for the welding current, the amperage is that measured by an iron vane type alternating current ammeter having a minimum error due to distorted wave shape, and may be 25, 50, or 60 cycle or other low frequency.

In the torch shown in Fig. 2, the electrode holder H and the nozzle N are both water cooled. The metal tube S communicates with an angular extension 10 which cooperates with an annular recess in the electrode holder H to form a water jacket 12 which communicates with the interior of the tube S. Water is supplied by a tube 14, and after passing around the water jacket 12, passes out through the tube S. Inert gas is supplied to the interior of the electrode holder H by a tube 15, and passes through slots K between fingers 16 of the gripping means G to the interior of the nozzle N.

The nozzle N is stainless steel, and has an annular recess near its upper end adjacent the gripping means G enclosed by a stainless steel band 18 to form a water jacket 20. Cooling water enters the jacket 20 by a pipe 21 and the heated water leaves by a pipe 22.

The following table lists the proper amperage for the respective size electrodes that are used in gas blanketed arc welding according to the present invention with alternating and direct current:

| Electrode Diameter (a) | Alternating Current | Direct Current, Straight Polarity |
| --- | --- | --- |
| Inches | Amperes | Amperes |
| 1/16 | 60–120 | 100–150 |
| 3/32 | 100–160 | 150–300 |
| 1/8 | 150–240 | 250–500 |
| 3/16 | 250–300 | 500–1000 |
| 1/4 | 350–500 | |
| 5/16 | 500–650 | |
| 3/8 | 600–750 | |

With these current ranges it is possible to gas blanket arc weld both very thin and heavy material, as well as intermediate thicknesses.

Below the minimum amperage with the respective size electrodes the arc is unstable in direct current welding with wandering local hot spots on the electrode, and the electrode end is not completely covered by the arc. In alternating current this condition aids rectification. Within the ranges given above in direct current welding the end of the electrode is completely covered by the arc and the electrode is hot but not molten. In alternating current welding within the ranges given above, the arc covers the end of the electrode and rectification is absent.

The uniform laminar flow of the inert gas necessary in combination with this high current density is provided by proportioning the nozzle or gas cup to increase its length. The new cup length (d) is 2½ to 4 inches from the nozzle gas inlet to the nozzle gas outlet, depending upon whether or not the nozzle or cup is used on hand or machine torches. The larger cup or nozzle improves the protection of the weld puddle and the surrounding area as well, by causing the shielding inert gas to approach laminar flow at the exit end of the nozzle, and thus eliminate turbulence and eddying currents which reduce the effectiveness of the gas blanket. The following table shows these basic gas nozzle dimensions:

| Electrode Diameter (a) | Nozzle Length (d) | Nozzle Diameter (c) |
| --- | --- | --- |
| Inches | Inches | Inches |
| 1/16 | 2 | 1/4 |
| 3/32 | 2¼ | 5/16 |
| 1/8 | 2½ | 3/8 |
| 3/16 | 3 | 5/8 |
| 1/4 | 3 | 3/4 |
| 5/16 | 4 | 7/8 |
| 3/8 | 4 | 7/8 |

The increased length (b) of the electrode has a range of the order of from 16 diameters for a one-sixteenth inch electrode to 6–7 diameters for a three-eighths inch electrode, with the intervening sizes proportionately in between in inverse ratio. With this extension the danger of melting or dropping off of the electrode which might result from the increase in temperature due to raising the amperage on a given electrode, is circumvented due to better gas protection. Currents as high as 750 amperes have been carried on a 3/8 inch electrode with no deterioration or discoloration.

The combination of increased nozzle length and nozzle diameter with each given electrode size, has greatly improved welding conditions. In alternating current welding it has eliminated rectification and with direct current welding it has produced a steady, stable arc. In both cases the welded bead shows qualities of adequate gas protection, clean appearance, and higher welding speeds with greater ease of operation. The electrode tip may be held as far as a whole inch away from the work without losing the arc, and much thicker plates can be welded.

With the proper dimensioning of the nozzle and the high current density, better welding results may be obtained than with the use of emissive coatings and/or polarity control. The above condition of high current density and electrode extension does not however give a completely balanced wave, the wave shape exhibiting more of the straight polarity component. With the new arrangement of electrode and gas nozzle the temperature of the shielding inert gas is increased, also creating a highly ionized path for the reestablishment of the current when the current value goes through zero.

What is claimed is:

1. Method of arc welding metals, which comprises passing alternating current of high current density through a non-depositing electrode and the work to maintain an arc, passing along the electrode to blanket the arc and molten portions of the work an annular stream of non-oxidizing gas containing essentially an inert gas and having a substantially constant diameter of the order of from 2⅓ to 4 times the electrode diameter and a length of the order of from 4 to 8 times its own diameter, and maintaining the alternating current density within the range of the order of from between 60 and 120 amperes for a one-sixteenth inch diameter electrode, up to between 600 and 750 amperes for a three-eighths inch diameter electrode.

2. Method of arc welding metals, which comprises passing direct electric welding current of high current density through a non-depositing electrode and the work to maintain an arc, passing along the electrode to blanket the arc and molten portions of the work an annular stream of non-oxidizing gas containing essentially an inert gas and having a substantially constant diameter of the order of from 2⅓ to 4 times the electrode diameter and a length of the order of from 4 to 8 times its own diameter, and maintaining the direct current density within the range of the order of from between 100 and 150 amperes for a one-sixteenth inch diameter electrode up to between 500 and 1000 amperes for a three-sixteenths inch diameter electrode.

3. Method of arc welding difficultly weldable metals, which comprises passing alternating electric welding current through a non-depositing electrode and the work to maintain an arc, passing an annular stream of non-oxidizing gas containing essentially an inert gas along the electrode to blanket molten portions of the work, maintaining laminar, non-turbulent flow of said gas by confining it in a substantially cylindrical surface having a diameter of the order of from 2⅓ to 4 times the electrode diameter and a length of the order of from 4 to 8 times its own diameter, and preventing rectification of said alternating current by maintaining the current density within the range of the order of from between 60 and 120 amperes for a one-sixteenth inch diameter electrode, up to between 600 and 750 amperes for a three-eighths inch diameter electrode.

4. Method of arc welding difficultly weldable metals, which comprises passing direct electric welding current through a non-depositing electrode and the work to maintain an arc, passing an annular stream of non-oxidizing gas containing essentially an inert gas along the electrode to blanket molten portions of the work, maintaining laminar, non-turbulent flow of said gas by confining it in a substantially cylindrical surface having a diameter of the order of from 2⅓ to 4 times the electrode diameter and a length of the order of from 4 to 8 times its own diameter, and preventing instability of the arc by maintaining the current density within the range of the order of from between 100 and 150 amperes for a one-sixteenth inch diameter electrode up to between 500 to 1000 amperes for a three-sixteenths inch diameter electrode.

5. Method of arc welding difficultly weldable metals, which comprises passing electric welding current through an electrode containing a refractory metal of the group consisting of tungsten and molybdenum and the work to maintain an arc, passing along the electrode to blanket the arc and molten portions of the work an annular stream of non-oxidizing gas containing an inert noble monatomic gas of the group consisting of helium and argon and having a substantially constant diameter of the order of from 2⅓ to 4 times the electrode diameter and a length of the order of from 4 to 8 times its own diameter to produce laminar, non-turbulent flow, preventing instability of the arc by maintaining the current density within the range of the order of from between 60 and 150 amperes for a one-sixteenth inch diameter electrode up to between 250 and 1000 amperes for a three-sixteenths inch diameter electrode whereby the arc covers the tip of the electrode, and maintaining the bare unsupported length of the electrode within the range of the order of between sixteen diameters for a one-sixteenth inch diameter electrode and six to seven diameters for a three-eighths inch electrode to prevent melting thereof under said high density current.

6. Method of arc welding metals, which comprises passing an electric welding current between a non-depositing electrode and the work to maintain an arc, passing along the electrode an annular stream of non-oxidizing gas containing essentially an inert gas to blanket the arc and molten portions of the work, maintaining the diameter of said stream substantially constant and of the order of from 2⅓ to 4 times the electrode diameter and the length of said stream along the electrode of the order of from 4 to 8 times its own diameter to approximate laminar, non-turbulent flow, and maintaining the current density within the range of the order of between 60 and 150 amperes for a one-sixteenth inch diameter electrode up to between 250 and 1000 amperes for a three-sixteenths inch diameter electrode to cause the arc to cover the tip of the electrode and thereby stabilize the arc.

7. Method of arc welding metals, which comprises passing an electric welding current between a non-depositing electrode and the work to maintain an arc, passing along the electrode an annular stream of non-oxidizing gas containing essentially an inert gas to blanket the arc and molten portions of the work, maintaining the diameter of said stream substantially constant and of the order of from 2⅓ to 4 times the electrode diameter and the length of said stream along the electrode of the order of from 4 to 8 times its own diameter to approximate laminar, non-turbulent flow, maintaining the current density within the range of the order of between 60 and 150 amperes for a one-sixteenth inch diameter electrode up to between 250 and 1000 amperes for a three-sixteenths inch diameter electrode to cause the arc to cover the tip of the electrode and thereby stabilize the arc, and maintaining the bare unsupported length of said electrode within the range of the order of between sixteen diameters for a one-sixteenth inch electrode and 6 or 7 diameters for a three-eighths inch diameter electrode to prevent melting thereof under such high current density.

8. The method of welding metals by the electric arc process which comprises passing an electric current between a non-depositing electrode and the work to maintain an arc, passing along the electrode a stream of non-oxidizing gas containing essentially an inert gas to blanket the arc and molten portions of the work, confining said stream in a nozzle of a substantially constant diameter of the order of from 2⅓ to 4 times the electrode diameter and a length along the electrode of the order of from 4 to 8 times its own diameter to approximate laminar, non-turbulent flow, maintaining the current density within the range of the order of between 60 and 150 amperes for a one-sixteenth inch electrode up to between 250 and 1000 amperes for a three-sixteenths inch diameter electrode to cause the arc to cover the tip of the electrode and thereby stabilize the arc, and passing cooling liquid in an annular stream adjacent the upper end of said nozzle spaced away from the arc, to prevent melting of said nozzle without materially cooling said electrode and said gas stream adjacent the arc.

9. Method of arc welding non-ferrous metals, which comprises passing direct welding current of high current density through a non-ferrous electrode and the work to maintain an arc, passing along the electrode to blanket the arc and molten portions of the work an annular stream of non-oxidizing gas containing essentially an inert gas and having a substantially constant diameter of the order of from 2⅓ to 4 times the electrode diameter and a length of the order of from 4 to 8 times its own diameter, and maintaining the direct current density within the range of the order of from between 150 amperes for a one-sixteenth inch diameter electrode up to 1000 amperes for a three-sixteenths inch diameter electrode.

FRANCIS M. DRAKE.

REFERENCES CITED

The following references are of record in the file of this patent:

UNITED STATES PATENTS

| Number | Name | Date |
| --- | --- | --- |
| 1,512,789 | Morton | Oct. 21, 1924 |
| 1,707,433 | Hand | Apr. 2, 1929 |
| 1,986,167 | Stresau | Jan. 1, 1935 |
| 2,043,960 | Jones et al. | June 9, 1936 |
| 2,310,164 | Prendergast et al. | Feb. 2, 1943 |
| 2,360,160 | Pickhaver | Oct. 10, 1944 |

FOREIGN PATENTS

| Number | Country | Date |
| --- | --- | --- |
| 863,983 | France | Jan. 8, 1941 |
| 507,116 | Germany | Sept. 12, 1930 |